(12) United States Patent
Chahl et al.

(10) Patent No.: US 6,429,418 B1
(45) Date of Patent: Aug. 6, 2002

(54) IMAGING SYSTEM

(75) Inventors: Javaan Singh Chahl, Curtin; Mandyam Veerambudi Srinivasan, Florey, both of (AU)

(73) Assignee: The Australian National University, Australian Capital Territory (AU)

( * ) Notice: Subject to any disclaimer, the term of this patent is extended or adjusted under 35 U.S.C. 154(b) by 0 days.

(21) Appl. No.: 09/308,646

(22) PCT Filed: Dec. 2, 1997

(86) PCT No.: PCT/AU97/00815
§ 371 (c)(1),
(2), (4) Date: Jul. 19, 1999

(87) PCT Pub. No.: WO98/25245
PCT Pub. Date: Jun. 11, 1998

(30) Foreign Application Priority Data

Dec. 2, 1996 (AU) .............................................. P03976

(51) Int. Cl.$^7$ ................................................. H01J 3/14
(52) U.S. Cl. ................................... 250/216; 250/559.12
(58) Field of Search ........................ 250/208.1, 203.2, 250/203.3, 203.6, 216, 201.5, 201.7, 559.12, 201.2; 396/123, 124; 356/3.05, 3.16

(56) References Cited

U.S. PATENT DOCUMENTS 3,988,059 A  10/1976  Johnson 5,760,826 A  * 6/1998  Nayar

FOREIGN PATENT DOCUMENTS

| GB | 2080945 | 2/1982 |
| JP | 59-24228 | 2/1984 |
| JP | 9-178920 | 7/1997 |
| JP | 9178920 | 7/1997 |
| WO | 95/06303 | 3/1995 |

OTHER PUBLICATIONS

An English Language abstract of JP 9–178920.
English Language Abstract of JP–9–178920.
English Language Abstract of JP–59–24228.

* cited by examiner

Primary Examiner—Frank G. Font
Assistant Examiner—Tu T. Nguyen
(74) Attorney, Agent, or Firm—Greenblum & Bernstein, P.L.C.

(57) ABSTRACT

A system for generating an image of a space includes a camera having an image plane and a field of view. A reflective surface is positioned within the field of view of the camera and configured to reflect radiation from the space onto the image plane of the camera. The camera occludes radiation from being received at the reflective surface from an area of the space and the reflective surface is configured such that the occluded area is of substantially constant or decreasing area with increasing distance into the space.

30 Claims, 5 Drawing Sheets

IMAGING SYSTEM

FIELD OF THE INVENTION

This invention relates to a system for generating an image of a space and to a system for projecting a previously acquired image.

BACKGROUND ART

There are many applications for systems which can generate a wide angle or panoramic image of a space from a single camera. Such applications include surveillance systems, and surveying and cinematography.

International patent application No. PCT/AU94/00501 (publication no. WO 95/06303) by the present applicant discloses a panoramic imaging system utilising a single camera and a dome like convex mirror. In one arrangement, the camera is mounted with respect to the mirror such that most of the mirror surface is within the field of view of the camera and the mirror surface has a profile which directs radiation from the space to the image plane of the camera. In another arrangement, the camera is embedded in the dome like mirror and a second mirror reflects radiation from the first mirror surface to the image plane of the camera. The disclosure of International patent application no. PCT/AU94/00501 is incorporated in this specification by cross-reference.

A difficulty with the earlier system is that the area of the space occluded by the camera, or by the secondary reflector used when the camera is mounted within the mirror, occludes part of the space to be imaged. The size of the occluded area increases with increasing distance from the mirror surface. That is, the size of the "blind zone" to the camera increases with increasing distance from the surface. A further difficulty is that the occlusion results in an image of the imaging device itself appearing usually at the centre of the image. This image does not contain information and reduces the area available for the non-occluded region of space.

DISCLOSURE OF THE INVENTION

It is an object of this invention to provide a system for generating an image of a space which will overcome, or at least ameliorate one or more of the foregoing disadvantages.

It is a secondary object of this invention to provide a system for projecting a previously generated image of a space.

Accordingly, in a first aspect, this invention provides a system for generating an image of a space, said system including camera means having an image plane and a field of view, a reflective surface positioned within the field of view of said camera and configured to reflect radiation from said space onto the image plane of said camera, said camera occluding radiation from being received at said reflective surface from an area of said space, and said reflective surface being configured such that said occluded area is of substantially constant or decreasing area with increasing distance into said space from said reflective surface.

In a second aspect, this invention provides a system for generating an image of a space, said system including camera means having an image plane and a field of view, a reflective surface configured to reflect radiation from said space onto a secondary reflector positioned in the field of view of said camera and configured to reflect incident radiation from said reflective surface onto the image plane of said camera, said secondary reflector occluding radiation from an area of said space from reaching said reflective surface and said reflective surface being configured such that said occluded area is of substantially constant or decreasing area with increasing distance into said space from said reflective surface.

In a third aspect, this invention provides a system for projecting an image into a space said system including means to direct light representative of said image onto a reflective surface, said reflective surface being configured to reflect said light into said space in a pattern which generates said image in said space, said means to direct light occluding light from being reflected from said reflective surface into an area of said space and said reflective surface being configured such that said occluded area is of substantially constant or decreasing area with increasing distance into said space from said reflective surface.

In a fourth aspect, this invention provides a system for projecting an image into a space said system including means to direct light representative of said image onto a secondary reflector configured to reflect incident light onto a reflective surface, said reflective surface being configured to reflect said light into said space in a pattern which generates said image in said space, said secondary reflector occluding light from being reflected from said reflective surface into an area of said space and said reflective surface being configured such that said occluded area is of substantially constant or decreasing area with increasing distance into said space from said reflective surface.

Preferably, the reflecting surface or primary mirror is circularly symmetric. Preferably, the primary mirror has a generally concave central portion surrounded by a generally convex portion in turn surrounded by a further generally concave portion. The camera is mounted on the axis of the circularly symmetric mirror. In the first aspect of the invention, the camera is directed at the primary mirror. In the second aspect of the invention, the camera is aligned with an aperture in the primary mirror formed around the optical axis and the secondary reflector directs radiation reflected by the primary mirror onto the image plane of the camera as described above.

Preferably, the image of the third and fourth aspects of the invention is an image generated using the systems of the first and second aspects of the invention respectively. That is, the principle of reversibility of light is used to project a previously recorded image of a space into a space with the pattern of light having the same angular distribution.

Preferably, the means to direct light representative of the image onto the reflective surface of the third and fourth aspects of the invention include a transparency through which light from an approximated point source is directed.

In one form of the invention, a discontinuity can be formed in the primary mirror surface or in the secondary reflector surface to prevent imaging of the occluded area.

The primary mirror and/or secondary reflector (where used) can provide optical gain where required.

It will be apparent that the system of this invention provides for minimal occlusion of the area being imaged and optionally for ensuring the imaging device is not visible in the output image. Additionally, the invention provides a system that allows the generated image to be projected through the same set of optics to provide a panoramic projection system.

Some embodiments of the invention will now be described, by way of example only.

BEST MODES FOR CARRYING OUT THE INVENTION

Some of the terms used in the following description are explained as follows:

Field of View: the angle of space visible to the imaging device, in most cases a video or stills camera.

Image: the pattern of light that falls on the active surface of the imaging device, if the imaging device is facing a mirrored surface, the properties of the pattern of light will depend on the shape of the mirror.

Field of View Gain: the ratio of the field of view of the camera, and the angle of the environment imaged when the camera views a specially shaped mirror or mirrors. This ratio is related to a specific surface or set of surfaces, and should be the same regardless of the field of view of the camera.

Occlusion: in the case of a camera viewing a mirrored surface, the occlusion is the part of angular space from the perspective of the camera, that is occupied by the reflection of the camera, thus blocking light from the environment on the other side of the camera.

An occlusion of imaged space can be conical, cylindrical, or inverted-conical. If an occlusion of space is conical, the size of an object that can hide in the gap increases with distance. That is, if the conical occlusion has angle θ then the size of the non imaged region h at distance d is given by:

$$h=2d \tan(\theta/2)$$

ie: h d

If the occlusion is cylindrical of width w then the width of the region is constant ie: h=w regardless of distance. Thus a 10 cm occlusion of the environment that is imaged, will be 10 cm wide at 1 m or 100 m.

If the occlusion is inverted-conical of width w and angle θ, then the size of the occlusion h with distance d decreases with increasing d and will eventually become negative, leading to multiple display of the same region in the centre of the image. In this case, h is given by:

$$h=w-2d \tan(\theta/2)$$

In the following description, wherever a cylindrical occlusion is obtained, an inverted conical occlusion can be achieved. The cylindrical occlusion produces the most consistent output image.

Figure 1A:
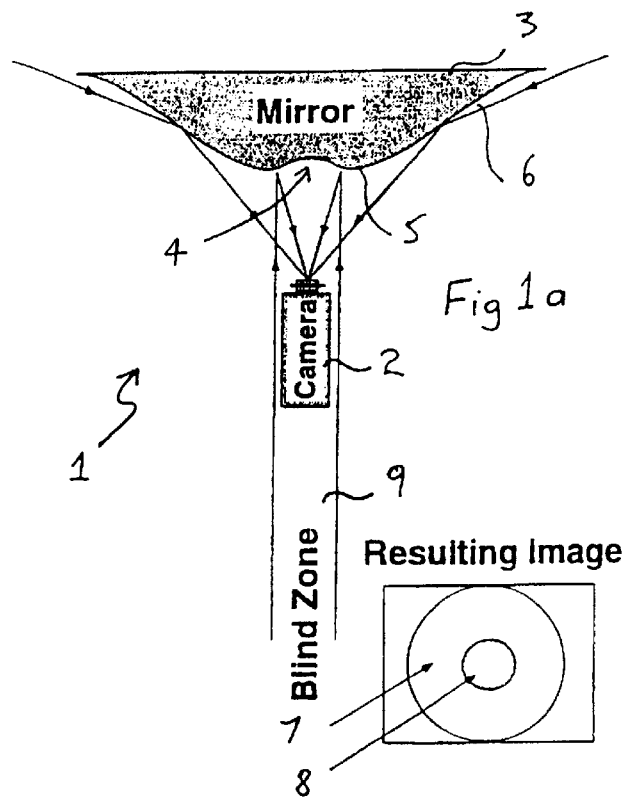
FIGS. 1a and 1b schematically show two different configurations of a single reflective surface and camera arrangement forming a system for generating an image in accordance with the invention as well as the resulting images generated in each case.
Figure 1B:
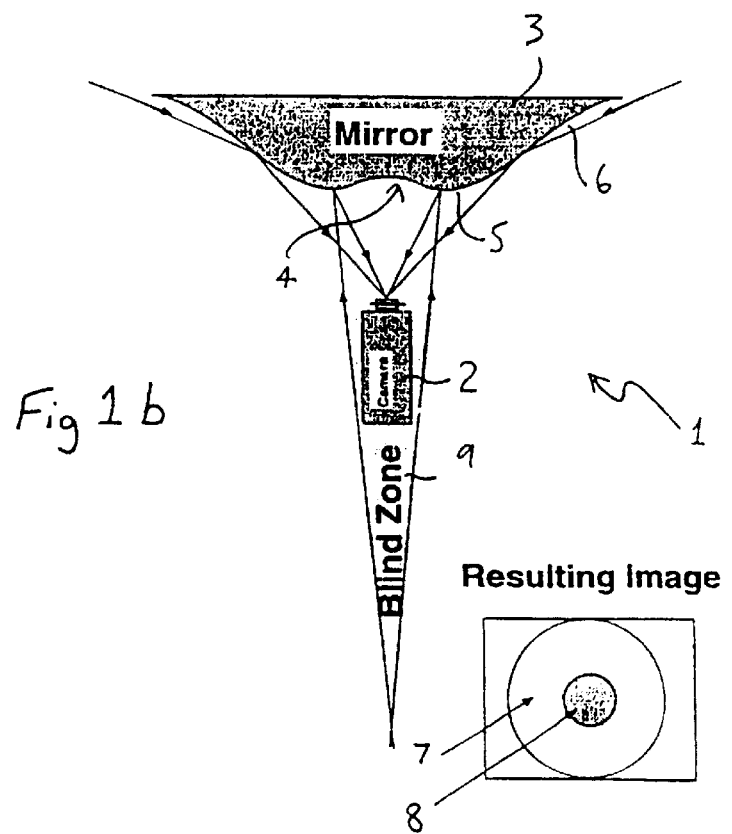

In one embodiment of the invention the camera is prevented from blocking an angular region of space behind the camera by shaping the reflective surface such that the environment is imaged on the surface, with a cylindrical occlusion of space as described above, in the area where the camera is positioned. If there is a requirement that the occlusion be smaller, then the occlusion can be inverted-conical, providing an occluded area that decreases with distance. The centre of the image does not contain useful information and the useful image information would be in an annulus around the centre of the image. FIGS. 1a and 1b show a system 1 for generating an image in accordance with this invention formed by a camera 2 and a reflective surface in the form of a mirror 3. In both FIGS. 1a and 1b the mirror surface is circularly symmetric and only the cross-sectional shape is shown in the drawings. The cross section is characterised by a central generally concave region 4 surrounded by a concentric annular general convex region 5 which is in turn surrounded by a outer concentric concave region 6. The mirror can be provided with an appropriate field of view gain. In the resulting imaging shown in each of FIGS. 1a and 1b, the image of the environment 7 is the only thing surrounding the image 8 of the camera 2. The extreme or limiting cases of incident rays are depicted in each case and illustrate the shape and position of the blind zone 9 behind the camera 2. In the arrangement of FIG. 1a, the primary reflector is designed such that the angular region of the world that is visible from the camera is some multiple of the field of view of the camera. This allows extremely wide angle images. FIG. 1b shows an arrangement in which the occluded region is inverted conical, and thus decreases with distance, until it becomes negative in width, at which point there is some overlap in the output image. The centre of the image contains the occluding object (the image of the camera) and is not useful. In this design, the occlusion type is set to an inverted cone by changing the size of the occluding imaging device, and looking at rays that impinge closer to the centre of the mirror.

The image of the imaging device can be removed from the image of the environment by introducing a discontinuity to the reflector that causes the relationship between camera radial angle and the angle of elevation of incoming light from the environment and the field of view gain factor to be offset from the vertical direction by the angular width of the occlusion. Thus the first visible ray in the output image comes from outside the occluded 30 region. The resulting image will look at an angle less than vertical at the centre, and increase outward, thus avoiding the imaging device being visible in the output image.

Figure 2A:
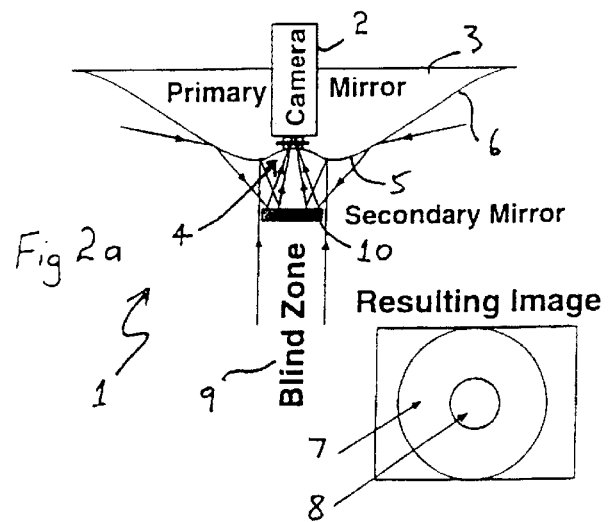
FIGS. 2a to 2f schematically show a number of different system for generating an image utilising a camera, a primary reflective surface and a secondary reflector according to the present invention together with the resulting images.
Figure 2B:
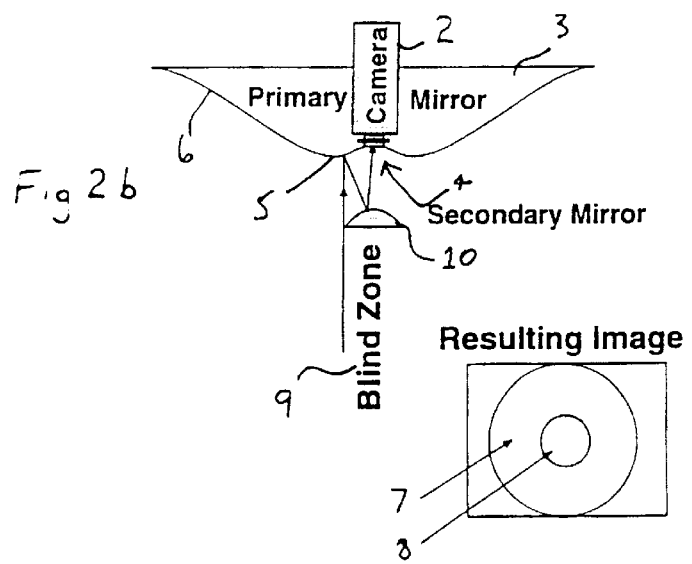

FIGS. 2a to 2f show a system for generating an image 1 which incorporates a secondary reflector 10. The elements of the system are otherwise the same as described above and the same reference numerals have been used to identify the corresponding elements. The rays drawn in the figures illustrate the position of blind zone 9 behind the secondary reflector 10 in each case. The use of the second reflector 10 serve several advantages. The first improvement is to decrease the size of the device by embedding the camera 2 in the primary reflector 3, and placing a secondary reflector 10 under the camera and reflector. This arrangement is shown in FIG. 2a. The secondary reflector mirror 10 can have a curve that produces an increased field of view thus allowing multiplication of field of view increase between the primary and secondary surface as illustrated in FIG. 2b. In both of these cases, the occlusion type can be either cylindrical or inverted-conical, as required.

Figure 2C:
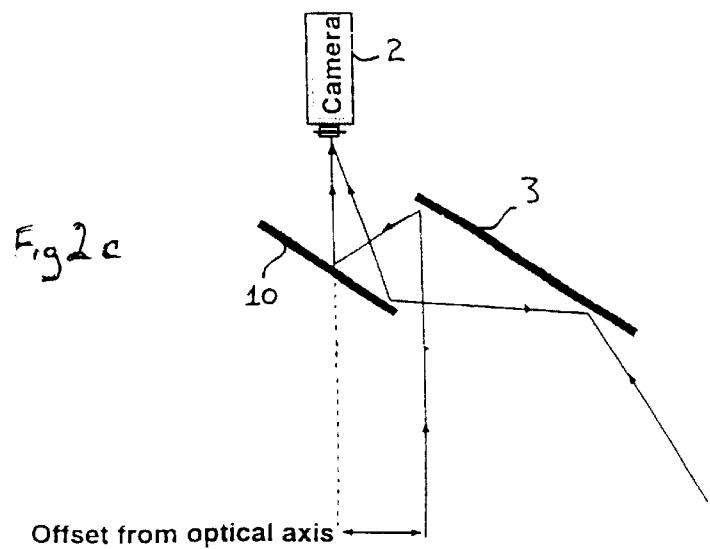
Figure 2D:
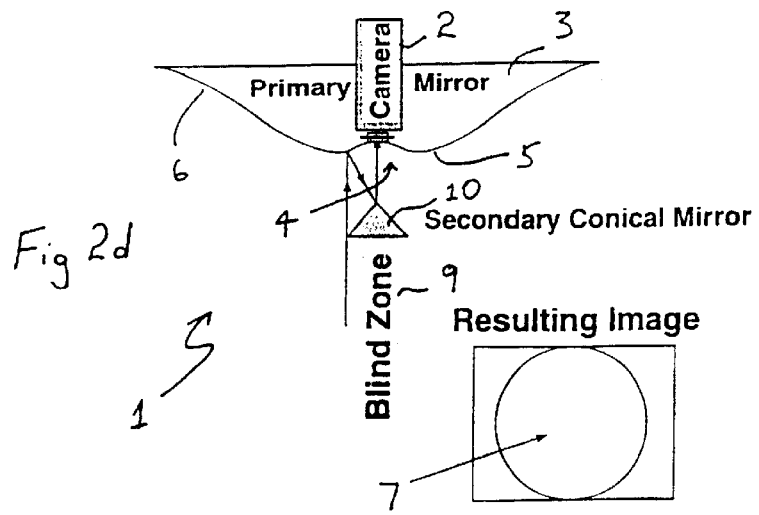
Figure 2E:
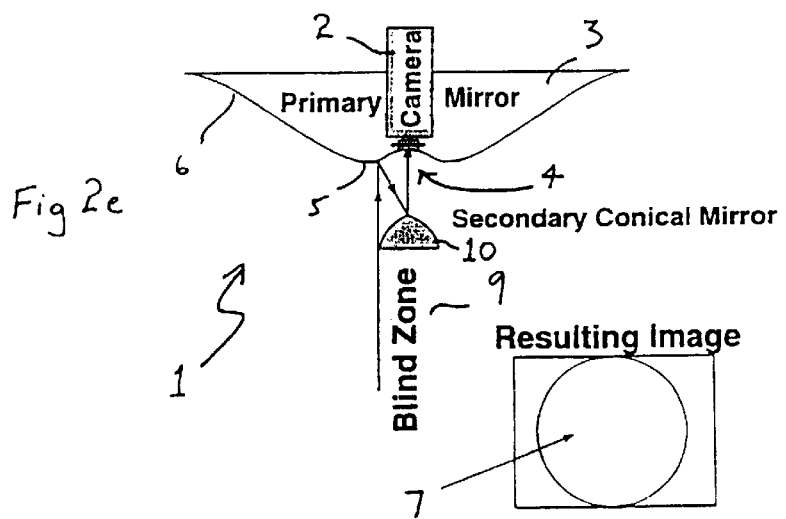
Figure 2F:
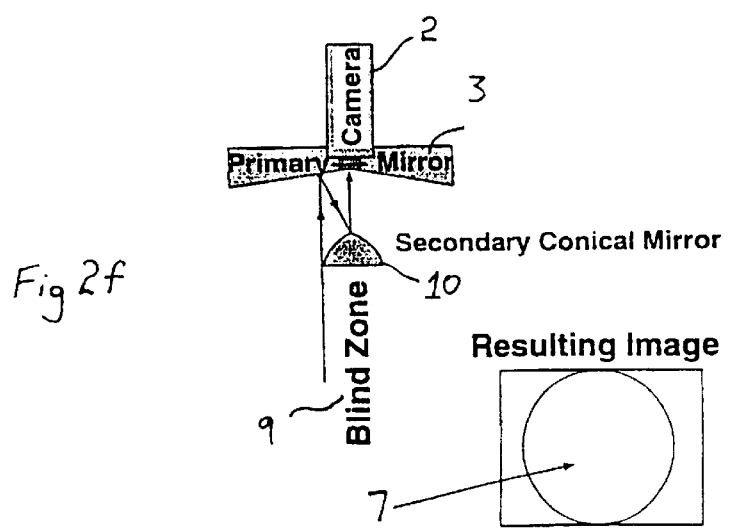

The most unobtrusive implementation of this aspect of the invention is to split the secondary mirror discussed above such that the primary mirror directly above the secondary mirror is not imaged. Thus the centre of the image seen by the camera corresponds to the perimeter of the cylindrical occlusion in the scene. Thus the resulting image is not annular, but continuous. This concept can easily be demonstrated with split planar mirrors 3, 10 (a two dimensional case of the conical mirrors shown) as shown in FIG. 2c. If the two mirrors 3, 10 are considered conical, the primary reflector an inverted cone cut into a block, and the secondary a normal cone (which splits the field of view, but does not increase it), the image seen by the imaging device would not contain the image of the secondary reflector, or the camera. Both surfaces can be designed to increase the field of view of the final image, with gain at either one or both of reflector 3 and secondary reflector 10 as illustrated in FIGS. 2d, 2e and 2f.

The equations governing the design of the simplest of the split, two mirror, minimal blind-zone configurations are detailed below.

Figure 3B:
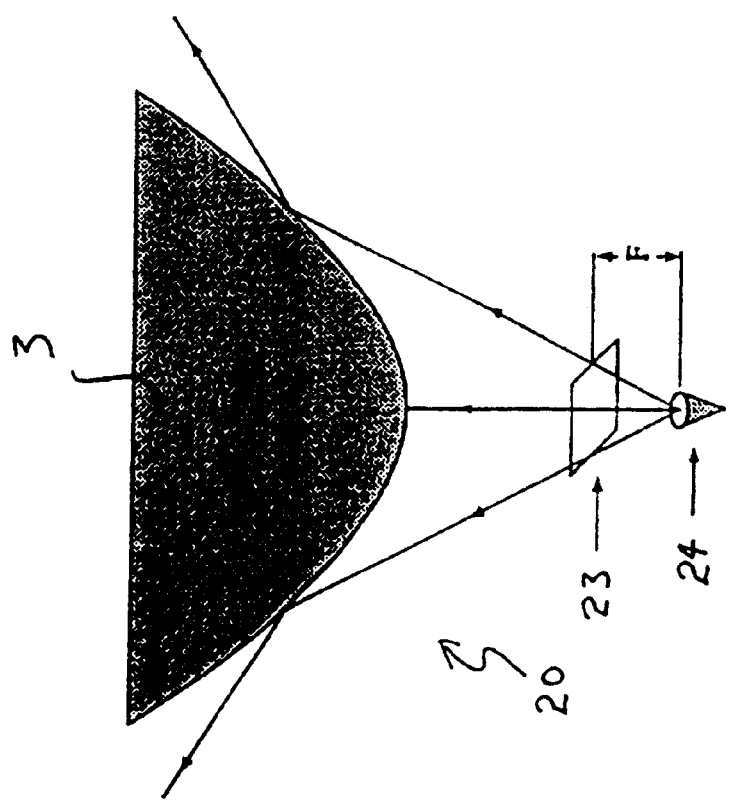
FIGS. 3a and 3b schematically show an image display and image projector system according to this invention.
Figure 3A:
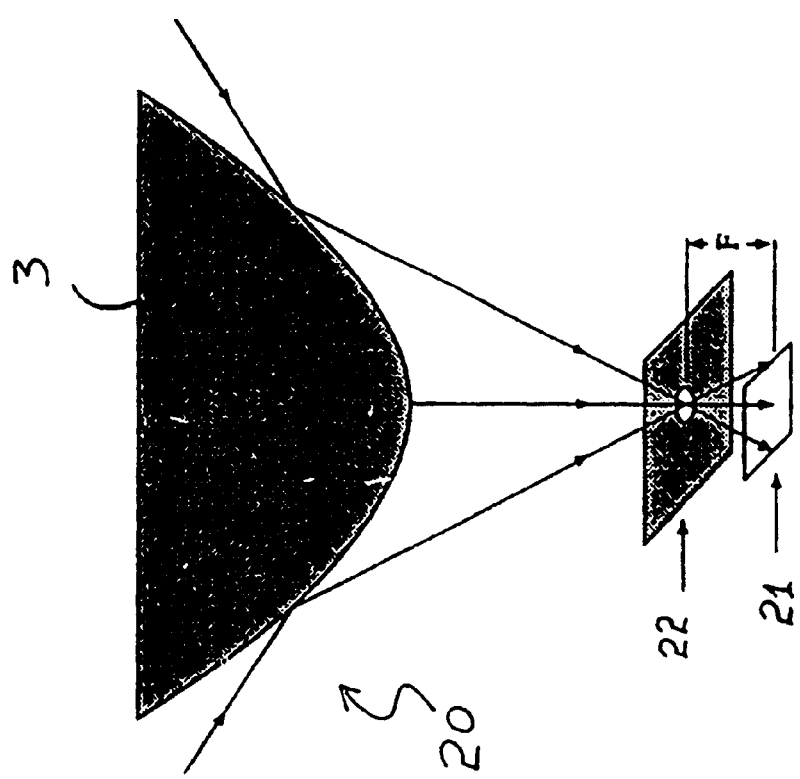

Using the property of light called reversibility, an image captured by the device can be reprojected through the same optical arrangement to illuminate the world with the same pattern of light as was originally captured. This principle can be used to produce a simple panoramic projection system, in which environments captured by the above-mentioned panoramic camera be examined in their original form. FIGS. 3a and 3b show how a panoramic imaging system 20 can also be used as a projector. In FIG. 3a images are captured from the environment onto an imaging plane 21 behind a lens 22 of focal length F. In FIG. 3b the image is placed on a transparency 23 and light from an approximation of a point light source 24 at distance F units behind the transparency is directed reflector surface 3 of the same shape. The pattern of light projected into the environment will have the same angular distribution as seen by the imaging device 20 at the previous location.

Description of Equations for a Reflective Surface

This derivation is based on the configuration in FIG. 2d utilising a polynomial surface 3 and a normal conical mirror 10. The camera 2 is embedded in the polynomial surface 3 and looks down on the cone 10. The cone 10 causes the field of view to be split such that a region of the polynomial surface 3 is not in view. This invisible region corresponds to the region that would contain the reflected image of the cone 10, and thus the camera 2. For a number of reasons, this is the simplest relationship to understand, and derive.

Figure 4:
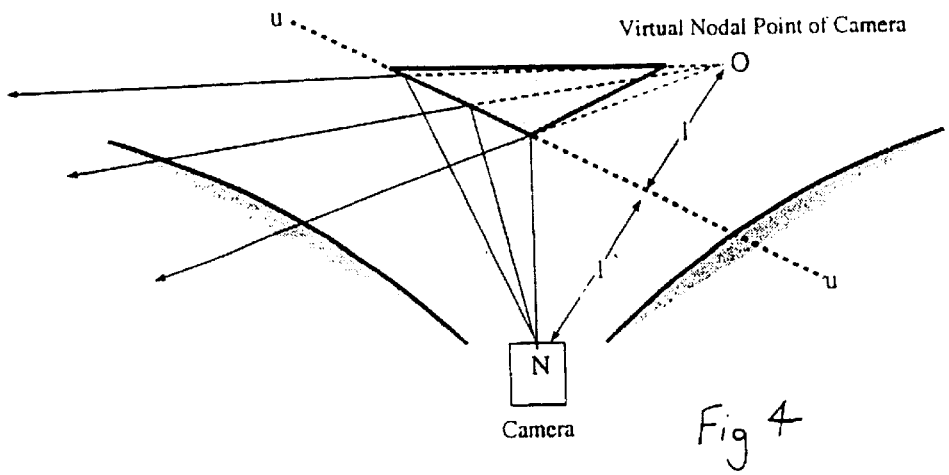
FIG. 4 is a ray diagram for use in the derivation of an equation representing a reflective surface used in a system for generating an image according to this invention.

With reference to FIG. 4, the cone 10 allows the camera 2 to be replaced by a nodal point at O, which is defined as the mirror image of the real nodal point at N on the mirror u—u. Thus the problem reduces the finding one surface, using O as the nodal point, and applying appropriate boundary conditions. The actual three dimensional polynomial surface 3 will be generated by forming the solid of rotation of the resulting two dimensional curve, about the vertical axis.

Figure 5:
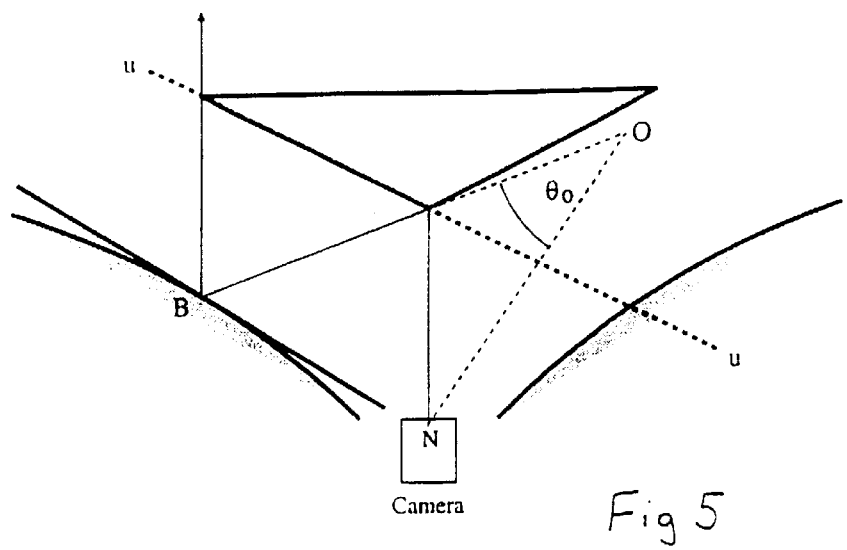
FIG. 5 is another diagram for use in the derivation of an equation representing a reflective surface according to this invention.

FIG. 5 shows how the cone allows the camera to be replaced by a nodal point at O, which is defined as the mirror image of the real nodal point at N for the purposes of derivation, this simplifies the process.

Figure 6:
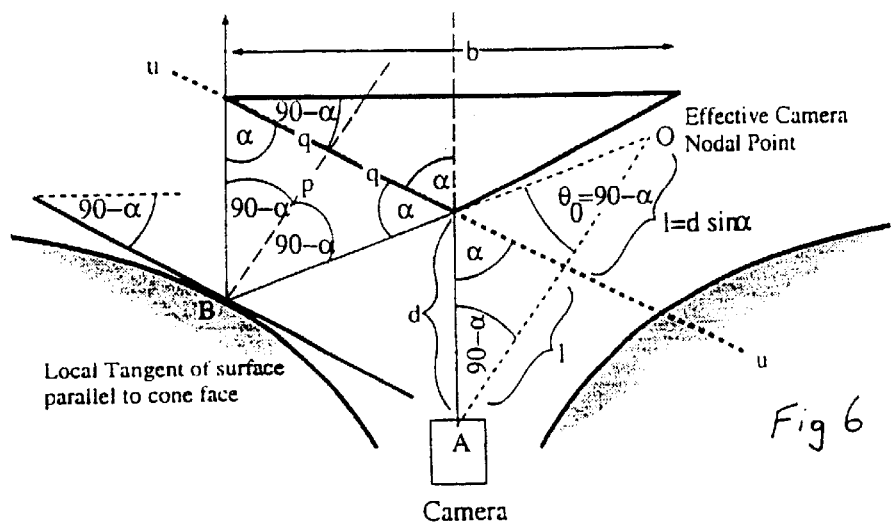
FIG. 6 is a still further diagram for use in the derivation of an equation representing a reflective surface according to this invention.

FIG. 6 shows the boundary conditions of the differential equation to be derived.

To ensure that the vertical downward ray entering the camera strikes the surface vertically in the opposite direction, the tangent to the surface at B must be parallel to the surface of u—u.

When $\theta=\theta_0$ (an angle determined by the cone geometry and camera distance to cone), then distance OB(r) is also specifiable in terms of cone geometry and camera distance.

With reference to FIG. 6

$$l = d\sin(\alpha)$$

$$q = \frac{b}{4\sin\alpha}$$

$$\frac{p}{q} = \tan\alpha$$

$$p = q\tan\alpha = \frac{b}{4\sin\alpha} \frac{\sin\alpha}{\cos\alpha} = \frac{b}{4\cos\alpha}$$

Using the effective camera nodal point as origin, and the line OA as axis, the surface generating differential equation may be written:

$$\frac{d}{d\theta}\left[\tan^{-1}\left(rd\frac{\theta}{dr}\right)\right] = K$$

Where K is a parameter that determines the elevation gain of the surface.

$$\tan^{-1}\left(\frac{rd\theta}{dr}\right) = K\theta + A \quad (1)$$

Where A is a constant of integration.

$$\frac{rd\theta}{dr} = \tan(K\theta + A)$$

$$\frac{dr}{r} = \frac{d\theta}{\tan(K\theta + A)}$$

Integrating, $1/K \log[\sin(K\theta+A)] = \log r + \log B = \log(Br)$ $$\sin(K\theta+A) = (Br)^K = Cr^K \quad \sin(K\theta+A) = Cr^K \quad (2)$$

Where K determines the gain and A and C are constants of integration.

Determining Constants of Integration
(a) When $\theta=\theta_0=90°-\alpha$, $$\tan^{-1}\left(\frac{rd\theta}{dr}\right) = \alpha,$$

ie: local tangent to surface is parallel to the cone face.
Substituting this into equation (1), gives:

$$A = K(\alpha-90°)+\alpha$$

Inserting this into equation (2) yields:

$$\sin[K(\theta+\alpha-90°)+\alpha] = Cr^K$$

When $\theta=\theta_0$, $r=r_0$=length (OB)

$$Length\ (OB) = d + \frac{b}{2\sin(2\alpha)}$$

inserting this into equation 3:

$$\sin(\alpha) = Cr_0^K$$

$$C = \frac{\sin(\alpha)}{r_0^K}$$

Thus the final equation describing the surface is:

$$\left[\frac{r_0}{r}\right]^K = \frac{\sin(\alpha)}{\sin(K[\theta + \alpha - 90^\circ] + \alpha)}$$

Where $r_0 = d$ $$r_0 = d + \frac{b}{2\sin(2\alpha)}.$$

Note that gain K, which is related to the elevational gain (2K+1), is negative.

The forgoing describes only some embodiments of this invention and modifications can be made without departing from the scope of the invention.

What is claimed is:

1. A system for generating an image of a space, said system including a camera having an image plane and a field of view, a reflective surface positioned within the field of view of said camera and configured to reflect radiation from said space onto the image plane of said camera, said camera occluding radiation from being received at said reflective surface from an area of said space, and said reflective surface being configured such that said occluded area is of substantially constant or decreasing area with increasing distance into said space from said reflective surface.

2. A system as claimed in claim 1 wherein said reflective surface is circularly symmetric and the image plane of the camera is arranged on the axis of symmetry.

3. A system as claimed in claim 2 wherein said reflective surface includes concentrically arranged concave and convex portions.

4. A system as claimed in claim 3 wherein said reflective surface includes a central generally concave portion surrounded by a generally convex portion in turn surrounded by an outer generally concave portion.

5. A system as claimed in claim 1 wherein said reflective surface includes a discontinuity to prevent imaging of the occluded region.

6. A system for generating an image of a space, said system including a camera having an image plane and a field of view, a reflective surface configured to reflect radiation from said space onto a secondary reflector positioned in the field of view of said camera and configured to reflect incident radiation from said reflective surface onto the image plane of said camera, said secondary reflector occluding radiation from an area of said space from reaching said reflective surface and said reflective surface being configured such that said occluded area is of substantially constant or decreasing area with increasing distance into said space from said reflective surface.

7. A system as claimed in claim 6 wherein said reflective surface is circularly symmetric and the image plane of the camera is arranged on the axis of symmetry.

8. A system as claimed in claim 7 wherein said reflective surface includes concentrically arranged concave and convex portions.

9. A system as claimed in claim 8 wherein said reflective surface includes a central generally concave portion surrounded by a generally convex portion in turn surrounded by an outer generally concave portion.

10. A system as claimed in claim 6 wherein said reflective surface includes a discontinuity to prevent imaging of the occluded region.

11. A system as claimed in claim 6 wherein an aperture is provided centrally in the reflector surface and said radiation is reflected from said secondary reflector to said camera through the aperture.

12. A system as claimed in claim 6 wherein said secondary reflector is a generally domed surface.

13. A system as claimed in claim 12 wherein said domed surface is smoothly curved.

14. A system as claimed in claim 6 wherein said secondary reflector is the surface of a cone.

15. A system as claimed in claim 14 wherein said reflective surface is described in polar co-ordinates (r, θ) by the equation $$\left[\frac{r_0}{r}\right]^K = \frac{\sin(\alpha)}{\sin(K[\theta + \alpha - 90^\circ] + \alpha)}$$

where K is the gain

α is the angle between the axis of symmetry and the secondary reflector surface $$r_0 = d + \frac{b}{2\sin(2\alpha)}$$

d is the distance from the apex of said cone to said image plane and b is the diameter of the base of the cone.

16. A system for projecting an image into a space said system including a device to direct light representative of said image onto a reflective surface, said reflective surface being configured to reflect said light into said space in a pattern which generates said image in said space, said device to direct light occluding light from being reflected from said reflective surface into an area of said space and said reflective surface being configured such that said occluded area is of substantially constant or decreasing area with increasing distance into said space from said reflective surface.

17. A system as claimed in claim 16 wherein said reflective surface is circularly symmetric and the device to direct light is arranged on the axis of symmetry.

18. A system as claimed in claim 17 wherein said reflective surface includes concentrically arranged concave and convex portions.

19. A system as claimed in claim 18 wherein said reflective surface includes a central generally concave portion surrounded by a generally convex portion in turn surrounded by an outer generally concave portion.

20. A system as claimed in claim 16 wherein said reflective surface includes a discontinuity to prevent imaging of the occluded region.

21. A system for projecting an image into a space said system including a device to direct light representative of said image onto a secondary reflector configured to reflect incident light onto a reflective surface, said reflective surface being configured to reflect said light into said space in a pattern which generates said image in said space, said secondary reflector occluding light from being reflected from said reflective surface into an area of said space and said reflective surface being configured such that said occluded area is of substantially constant or decreasing area with increasing distance into said space from said reflective surface.

22. A system as claimed in claim 21 wherein said reflective surface is circularly symmetric and the device to direct light is arranged on the axis of symmetry.

23. A system as claimed in claim 22 wherein said reflective surface includes concentrically arranged concave and convex portions.

24. A system as claimed in claim 23 wherein said reflective surface includes a central generally concave portion surrounded by a generally convex portion in turn surrounded by an outer generally concave portion.

25. A system as claimed in claim 21 wherein said reflective surface includes a discontinuity to prevent imaging of the occluded region.

26. A system as claimed in claims 21 wherein an aperture is provided centrally in the reflector surface and said light is directed from said device to said secondary reflector through the aperture.

27. A system as claimed in claim 21 wherein said secondary reflector is a generally domed surface.

28. A system as claimed in claim 27 wherein said domed surface is smoothly curved.

29. A system as claimed in claim 21 wherein said secondary reflector is the surface of a cone.

30. A system as claimed in claim 29 wherein said reflective surface is described in polar co-ordinates (r, θ) by the equation $$\left[\frac{r_0}{r}\right]^K = \frac{\sin(\alpha)}{\sin(K[\theta + \alpha - 90^0] + \alpha)}$$

where K is the gain

α is the angle between the axis of symmetry and the secondary reflector surface $$r_0 = d + \frac{b}{2\sin(2\alpha)}$$

d is the distance from the apex of said cone to said image plane and b is the diameter of the base of the cone.

* * * * *